J. H. JASPER.
BOLT LOCK.
APPLICATION FILED FEB. 7, 1917.
1,261,130.
Patented Apr. 2, 1918.
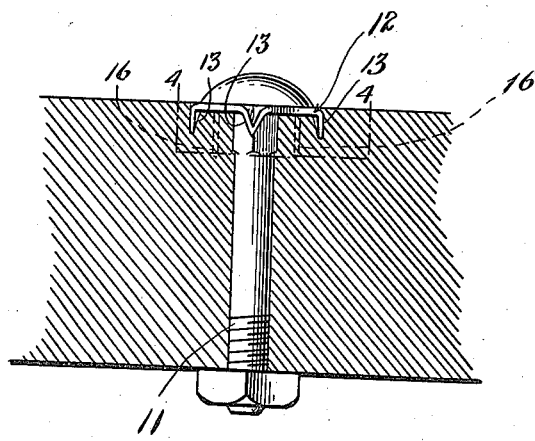
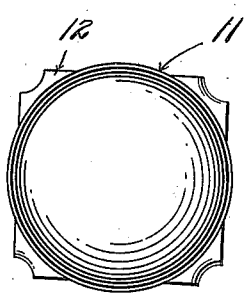
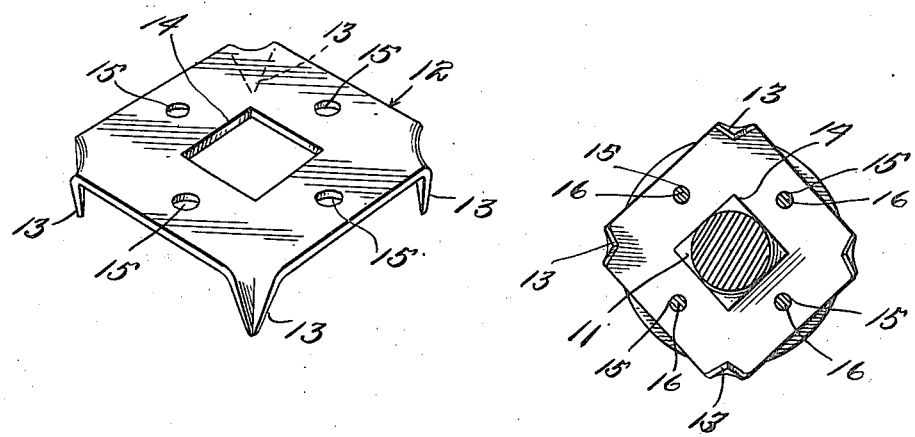
Inventor
J. H. Jasper

UNITED STATES PATENT OFFICE.

JOSEPH H. JASPER, OF DETROIT, MICHIGAN.

BOLT-LOCK.

1,261,130. 
Specification of Letters Patent. 
Patented Apr. 2, 1918.

Application filed February 7, 1917. Serial No. 147,166.

*To all whom it may concern:*

Be it known that I, JOSEPH H. JASPER, a citizen of the United States, residing at Detroit, in the county of Wayne, State of Michigan, have invented certain new and useful Improvements in Bolt-Locks; and I do hereby declare the following to be a full, clear, and exact description of the invention, such as will enable others skilled in the art to which it appertains to make and use the same.

This invention relates to improvements in bolt locks.

The principal object of the invention is to provide a simple and novel device for preventing a bolt from turning in the object, through which it is disposed.

Another object is to provide a simple device of this character which will automatically attach itself to the object and thus prevent its turning.

Other objects and advantages will be apparent from the following description when taken in connection with the accompanying drawings.

In the drawings:

Figure 1 is a side elevation of a bolt and one of my locking washers, a wooden object being shown in section, Fig. 2 is an end view looking at the head of the bolt, Fig. 3 is a perspective view of the locking washer removed, and Fig. 4 is a sectional view on the line 4—4 of Fig. 1, with the wood block removed.

Referring particularly to the accompanying drawings, 10 represents an object preferably wood through which is disposed the bolt 11. The portion of the shank of the bolt adjacent the head is square in cross section as clearly shown. The locking washer comprises a rectangular or other shaped plate 12 at four points on the periphery of which are formed the sharp pointed tangs 13. Within the center of the plate is a square opening 14, this opening being provided for the reception of the squared portion of the bolt. The washer plate is placed against one face of the object 10 with its square opening registering with the opening in the object. The bolt is then passed through the openings of the plate and object and a nut and washer applied to the threaded end of the bolt which extends through the opposite side of the object. Upon turning the nut the washer plate will be drawn toward the face of the object and the tangs forced into the wood. Thus the bolt is held against turning in either direction and eliminating any tendency for the nut to back off therefrom. As an added feature of security in holding the washer plate there is provided a plurality of openings 15 which receive nails or screws 16 therethrough and into the wood object 10.

It will be noted that the nail or screw openings are formed through the washer plate in such position that the head of the bolt will completely cover them, and that when the nut is being screwed home, the head of the bolt will engage the heads of the screws or nails and complete the driving of the same into the wood. Thus the nails or screws are positively held against displacement. This is especially useful when the device is used in the corner of a framework, the nails holding the joint of the frame together and preventing splitting of the wood by a tendency of the bolt and washer plate to turn.

Attention is called to the fact that the tangs 13 are concavo-convex in cross section, thereby greatly strengthening the same and also preventing any twisting movement of the washer plate in the wood.

What is claimed is:

A washer plate for locking a bolt having a shank formed with a squared portion, said plate being rectangular in outline and having a central angular opening for the reception of the said squared portion of the bolt, the corners of the plate being formed with triangular tangs which are transversely concavo-convex, said plate having a plurality of smaller openings surrounding the central opening.

In testimony whereof, I affix my signature.

JOSEPH H. JASPER.